US005606691A

United States Patent [19]

Watts et al.

[11] Patent Number: 5,606,691
[45] Date of Patent: Feb. 25, 1997

[54] METHOD OF SEARCHING A DATABASE USING SELECTED CRITERION HAVING IMPLICIT LOGICAL OPERATION

[75] Inventors: Michael Watts, Morgan Hill; Robert Nazarenus, San Jose; Kathleen Lane, Los Altos; Fai-To Leung; Alan Steinhauer, both of Sunnyvale, all of Calif.

[73] Assignee: Harman Interactive Inc., San Jose, Calif.

[21] Appl. No.: 337,285

[22] Filed: Nov. 10, 1994

[51] Int. Cl.$^6$ ........................................... G06F 17/30
[52] U.S. Cl. ........................... 395/604; 364/DIG. 1; 364/282.1
[58] Field of Search ............................................ 395/600

[56] References Cited

U.S. PATENT DOCUMENTS

| | | | |
|---|---|---|---|
| 5,206,949 | 4/1993 | Cochran et al. | 395/600 |
| 5,463,543 | 10/1995 | Wagner | 364/141 |
| 5,483,586 | 1/1996 | Sussman | 379/201 |

Primary Examiner—Thomas G. Black
Assistant Examiner—John C. Loomis
Attorney, Agent, or Firm—Limbach & Limbach L.L.P.

[57] ABSTRACT

A method of searching a database uses a plurality of search criteria each having an implicit logical operation associated therewith. After one or more of the search criteria is selected, a computer system with appropriate software formulates the search including the implicit logical operation to search the database, all without the need for the user to input any logical operation connecting the one or more of the selected desired search criterion.

18 Claims, 3 Drawing Sheets

METHOD OF SEARCHING A DATABASE USING SELECTED CRITERION HAVING IMPLICIT LOGICAL OPERATION

This application is submitted with a microfiche appendix, Exhibit A, containing copyright material, Copyright 1994, Harman Interactive, Inc., consisting of seven (7) fiches with six hundred eighhty (680) frames.

The copyright owner has no objection to the facsimile reproduction by anyone of the patent document or the patent disclosure, as it appears in the Patent and Trademark Office patent file or records, but otherwise reserves all copyrights whatsoever in the appendix.

TECHNICAL FIELD

This invention relates to a method of searching a database without the need for a user to explicitly input one or more logical operations connecting the search criteria. More particularly, this invention relates to a method of searching a database comprising an audio visual programming schedule, such as a television broadcast schedule, using search criteria selected by a user, without inputting logical operations for the search criteria.

BACKGROUND OF THE INVENTION

Methods for searching a database are well known in the art. Typically, a user inputs or selects a plurality of search criteria. In addition, the user inputs one or more logical operations, such as AND, OR etc., connecting the plurality of search criteria. Based upon the plurality of search criteria and the logical operations connecting the search criteria, the database is searched. An example of a search query may be criterion A AND, criterion B NOT, criterion C OR criterion D. Thus, in the prior art, the search for a database has necessitated the user selecting or inputting a plurality of search criteria and one or more logical operations logically connecting the search criteria. However, by requiring the user to input logical operations, difficulties can be created with users who are not "technically" oriented.

Finally, it is well known that audio visual programming schedules, such as off-the-air broadcast schedule of television signals, can comprise a database. Thus, the application of search methods to search such programming schedules but without the need for the user to input logical operations would greatly facilitate the search of the programming schedule.

SUMMARY OF THE INVENTION

In the present invention, a method of searching a database uses a computer having a display device with a pointing device for visually indicating a position through a cursor means on the display device. The method comprises the steps of displaying a plurality of search criteria on the display device with each of the plurality of search criteria having a logical operation associated therewith. The cursor means can be moved on the display device by the user, through the use of the pointing device to a desired one of the plurality of the displayed search criteria. One or more of the plurality of displayed search criteria can be selected by the user by activating the pointing device when the cursor means is positioned over the desired criterion. The database is searched by the computer after selecting all the desired search criteria, using the logical operations associated with all the desired search criteria without the user inputting any logical operation. The results of the search are displayed on the display device.

DETAILED DESCRIPTION OF THE DRAWINGS

Figure 1:
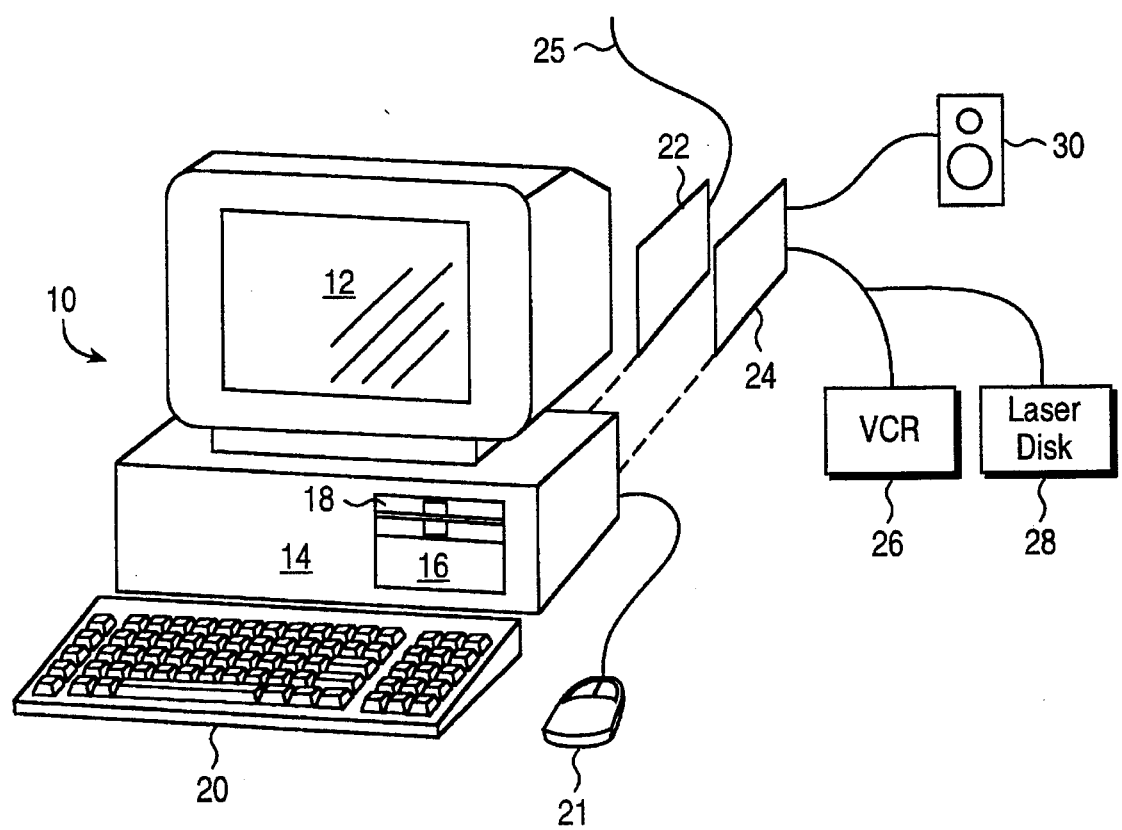
FIG. 1 is a schematic block level diagram of a computer system suitable for carrying out the method of the present invention.

Referring to FIG. 1 there is shown a block level diagram of a computer system 10 suitable for carrying out the method of the present invention. The computer system 10 can be a well known IBM PC compatible computer system with an Intel X86 microprocessor or a compatible microprocessor, executing the Windows Operating System program available from Microsoft Corporation. The system 10 comprises a housing 14 containing a motherboard having the microprocessor and necessary memory (not shown). In addition, the system 10 comprises peripheral components such as a hard disk drive 16 and a floppy disk drive 18. The system 10 also receives input signals from a keyboard 20 and a pointing device, such as a mouse 21, both of which can be operated and activated by the user, respectively. Finally, the system 10 has a display device 12 for displaying the output of the system 10. Such a computer system 10, as previously stated, is well known in the art and can be purchased "off the shelf".

The method of the present invention is practiced by executing a program stored on the hard disk 16 by the computer system 10. The program executed by the computer system 10 for implementing of the method of the present invention is a software application program operating under Windows. The program, in source code listing, is set forth in the microfiche appendix A. The program is written in Visual Basic 3.0, available from Microsoft Corporation, and C-Language along with code written in VBX.

Although not necessary to the method of the present invention, the computer system 10 can also comprise a modem 22 having a telephone line 25 connected to a public carrier. Such a modem 22 is well known in the art and can be on an expansion card that can be plugged into any one of the expansion cards available in the computer system 10 on the motherboard. In addition, the system 10 can comprise a tuner expansion card 24. Similar to the modem card 22, the tuner card 24 can be electrically connected to any one of the interface slots available on the motherboard of the computer system 10. In the preferred embodiment, the tuner board is a PC Prime Time V-6 and is available from Charter Electronic Inc. The tuner board 24 can be connected to a speaker 30 for audio output and can be connected to a VCR 26 and/or a laser disk 28 for a visual output.

As previously stated, the method of the present invention is implemented by executing the program, set forth in Appendix A. The program, in part, assists the user to search through a database comprising a programming schedule of off-the-air broadcast television schedule. In one embodiment, the database can be obtained by the modem 22, from a bulletin through the public telephone line 25 through a public carrier. In another embodiment, the database can be obtained by inputting programming schedule recorded on one or more magnetic disks through the floppy disk drive 18.

Finally, the database can even be obtained from "off-the-air" broadcast through the tuner 24 in accordance with the teaching of U.S. Pat. No. 4,706,121. However, In the preferred embodiment, the database is obtained from the public bulletin board through the public carrier 25 or through the floppy disk drive 18. Approximately two-weeks' worth of programming data ca be stored on the hard disk 16.

Figure 2:
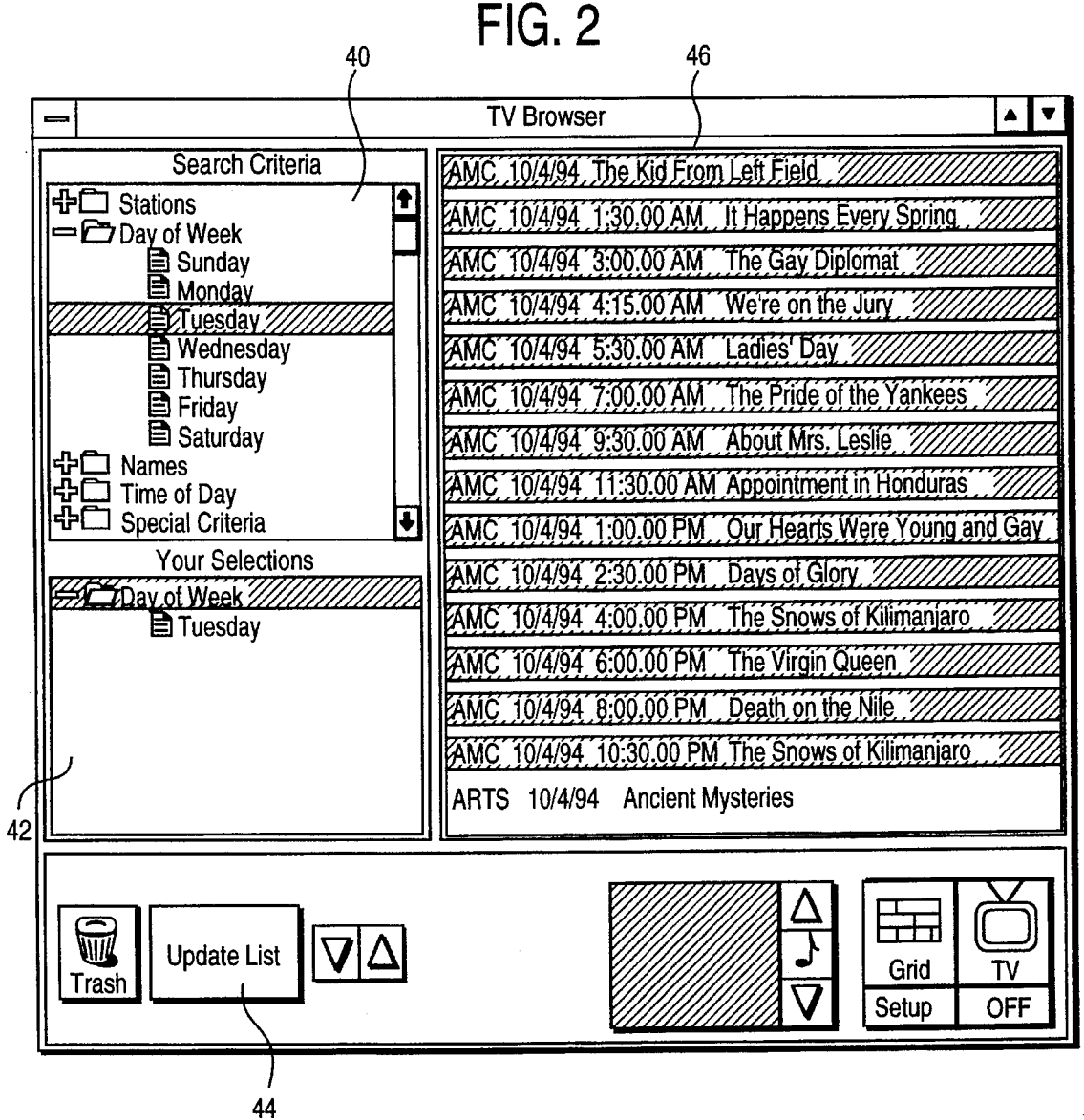
FIG. 2 is an example of a display on the display device of the computer system shown in FIG. 1, in carrying out the method of the present invention.

In the method of the present invention, when the program set forth in Appendix A is executed, a display screen such as that shown in FIG. 2, is displayed on the display device 12. The display screen comprises three parts. In a first portion 40 of the display screen, a list of search criteria is displayed. Two types of search criteria are displayed in the first portion 40. A first type consists of five (5) different search criteria: stations, days of the week, names, time of the day, and special criteria. Within the search criterion of stations, is a list of sub-criteria which include all the available calling codes of the television stations broadcasting within the vicinity of the user.

To "open" the search criterion "stations", the user through the mouse 21 moves or positions a cursor over the search criterion of "stations" and clicks on the mouse 21. This will then display a plurality of sub-criteria of station codes that broadcast television programs which the user can receive.

Within the search criterion of "day of week", are the sub-criterion of: Sunday, Monday, Tuesday, Wednesday, Thursday, Friday, and Saturday. Again, to activate and select one of these seven (7) search sub-criterion, the user, through the mouse 21, positions the cursor over the "day of week" criterion and by clicking the mouse 21, opens the search criterion of "day of week" to display the seven (7) sub-criteria within the category of "day of week". As can be seen in FIG. 2, the icon of "day of week" showing a folder like image is open to show the criteria that are contained within the criterion of "day of week".

The search criterion of "names" when opened, permits the user to input the name of an actor or actors, director, and a title of a particular movie or show with which the user seeks the search of in the database.

Within the search criterion of "time of day" when activated, four (4) sub-criteria of time periods would be displayed. In the preferred embodiment, they are "day", "noon", "prime" and "night". Of course, it is possible to even set forth the sub-criteria by hours or sub-hour segments.

Within the search criterion of "special criteria", when activated, the user would find the following plurality of sub-criteria: "black and white", "closed caption", "colorized", "network", "paid programming", "stereo", and "syndicated".

Each of the aforementioned search criterion and its respective sub-criteria are for illustration purposes and clearly the invention is not limited to these particular types of search criteria, or their sub-criteria.

As previously discussed, the user opens the displayed search criteria by clicking on the mouse 21 when the cursor is positioned over the particular search criterion of interest to display further searchable sub-criteria. If one of the further searchable sub-criterion is desired, the user then moves the mouse 21 until the cursor is positioned over the particular sub-criterion. For example, as shown in FIG. 2, the cursor is positioned over the searchable sub-criterion of "Tuesday". If the sub-criterion of "Tuesday" is desired, the user clicks on the mouse 21 and "drags" the sub-criterion of "Tuesday" into a second portion 42 of the display 12. The computer 10 executing the programming would respond by displaying a duplicate copy of the sub-criteria "Tuesday" in the second portion 42 of the display 12.

After the user has selected one or more search criterion (including any sub-criterion) from the first plurality of the five (5) criteria, the user then proceeds to select a search criterion (or its associated sub-criterion) from a second plurality. The second plurality of search criteria is also displayed in the first portion 40 of the display 12. The second plurality of search criteria comprises generally the type of subject matter for the programming that the user desires to search. Thus, the search criteria in the preferred embodiment of the second plurality are "entertainment", "financial", "health", "hobbies/crafts", "instructional", "movies", and "sports". Each of these search criteria from the second plurality is subdivided into further sub-criteria. The sub-criteria are displayed when the icon for the search criteria is opened by positioning the cursor over the particular search criterion and activating or "clicking" the mouse 21. The system 10 responds by displaying the sub-criteria within that one selected criterion of the second plurality.

Similar to the discussion for the selection of a search criterion from the first plurality, a search criterion from the second plurality is selected by positioning the cursor over the desired search criterion (or its sub-criterion), clicking on the mouse 21 and "dragging" the activated search criterion into the second portion 42 of the display 12.

It should be noted that the user need not select all the desired criteria from the first plurality before selecting the desired criteria from the second plurality. The order in which the desired criteria (or desired sub-criteria) are selected from the first portion 40 and dragged into the second portion 42 is not important.

When the user has selected all the desired search criterion or sub-criterion, from the first portion 40, and the desired criteria are displayed in the second portion 42, the user then positions the cursor over the icon "update list" 44 and clicks the mouse 21. The programming executing on the computer system 10 would then search through the database of programming schedule to determine those programs satisfying the desired criteria displayed in the second portion 42. The results of the search would be displayed in the third portion 46, without the need for the user further inputting the logical operation connecting the selected desired criteria in the second portion 42. The manner in which the program searches through the database using the selected criteria is as follows.

Figure 3:
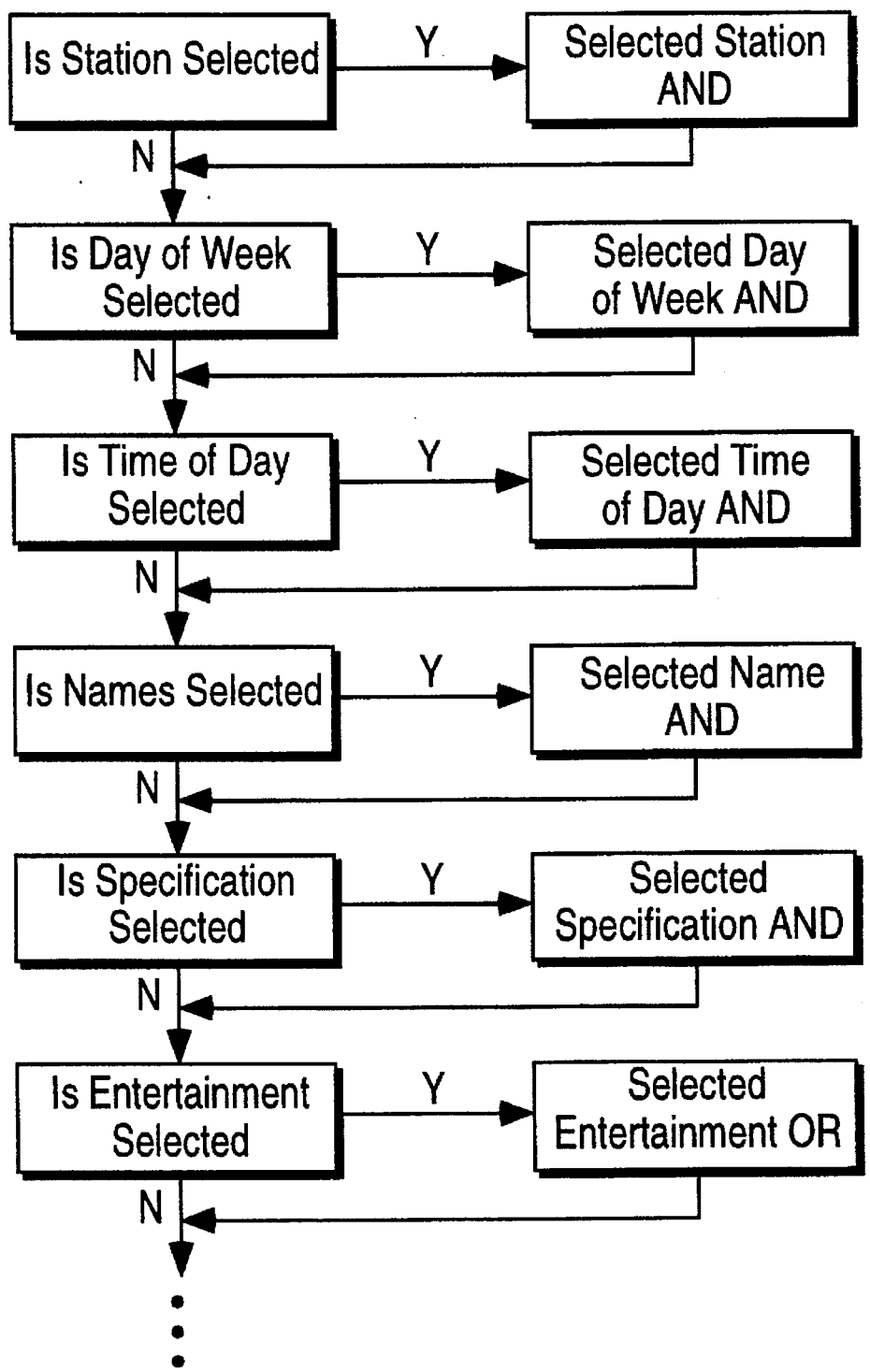
FIG. 3 is a flow chart of the program executed by the computer system to carry out the method of the present invention.

Referring to FIG. 3 there is shown a flow chart of the portion of the program set forth in Appendix A showing the method of the present invention. As previously discussed, there are two pluralities of search criteria. For the first plurality comprising of the five search criteria: "stations", "day of week", "names", "time of day", and "special criteria", an implicit logical operation of AND is associated with each of these search criteria. Thus, if any search criterion is selected from this first plurality, the program automatically associates the logical operation of "AND" to each of the selected desired criterion. Therefore, as shown in FIG. 3, if a station is selected, then the selected station has a logical operation of AND associated with the selected station by the program. Similarly, for any selected day of the week criterion, the program associates a logical operation of AND therewith as well. If no sub-criterion is selected from a criterion the program assumes that all of the sub-criteria are desired, or the entire criterion is desired. Thus, for example, if no specific station is selected, then the program assumes that the user desires to search for all stations, as if the criterion of "stations" is selected.

With respect to the search criteria from the second plurality, the program automatically associates the logical operation of "OR" with each of the selected sub-criterion. If no subs-criterion within a search criterion is selected, the program assumes that none of the sub-criteria is desired.

When the update list icon is activated after all the desired criteria have been selected and have been dragged into the second portion 42, the computer system 10 executing the program set forth in Exhibit A, forms a search based upon the desired selected criteria from the first plurality ANDed together to form a result, and with the result ANDed with each of the desired selected criteria from the second plurality which had been ORed. The results of the search of the database of programming schedules are displayed in the third portion 46.

Thus, for example, if the user selected the following sub-criteria:

KCBS (station)

evening (time)

Tuesday (day of week)

Financial

Sports

The computer systems 10 searches the database for programs satisfying the following relationship: KCBS AND evening AND Tuesday AND "all names" AND "all special criteria" AND financial; OR KCBS AND evening AND Tuesday AND "all names" AND "all special criteria" AND Sports.

With the result displayed in the third portion 46 of the display 12, the user can position the cursor over each one of the desired results and by clicking on the mouse 21, select the desired result. Thereafter, the user can activate the icon to control the recording of the VCR 26. Thus, the results of the search in the database, can be used to activate the VCR 26 to commence the recording of the desired program at the desired time and at the desired channel.

Although the preferred embodiment has been described wherein the selected search criterion from the first portion 40 is selected by activating the mouse 21 and "dragging it" into the second portion 42, the method of the present invention need not be so limited. Thus, for example, the user may simply activate the desired search criteria in the first portion 40 by "double clicking" or "shift clicking" the mouse 21 when the cursor is positioned over the desired search criterion. The "double clicking" or "shift clicking" of the mouse 21 can cause a highlight of the desired search criterion. When all the desired search criteria have been so highlighted, the cursor means is then positioned over the update list 44 and is activated. The program executing on the computer system 10 would respond in the manner described heretofore by performing the necessary logical operation implicitly associated with each of the highlighted criteria displayed in the first portion 40. In this manner, the "dragging" of each of the desired criterion from the first portion 40 to the second portion 42 is avoided, but achieving the same desired result of forming the necessary search of the database by the implicit logical operations associated with the selected search criteria.

It should be further understood that the method of the present invention need not be limited solely to the search of a database of programming schedule. The method of the present invention can be practiced to search for any type of database. The advantage of the method of the present invention is that it avoids the necessity of the user inputting logical operations which can be confusing.

What is claimed is:

1. A method of searching a database using selected criteria selected from a plurality of search criteria, by the use of a computer having a display device having a pointing device for visually indicating a position through a cursor means, on the display device said method comprising the steps of:

for each of a plurality of search criteria, displaying on a first portion of said display device a plurality of search sub-criteria;

moving the cursor means on the display device, through the use of the pointing device to a desired one of said plurality of displayed search sub-criteria on said first portion of said display device;

selecting one or more of said plurality of displayed search sub-criteria activating the pointing device when said cursor means is positioned over said desired sub-criterion;

moving the selected sub-criterion from the first portion of said display device to a second portion of said display device;

automatically selecting all displayed search sub-criteria for any of said search criteria having an AND logical operation associated therewith and for which no search sub-criteria is otherwise selected by the user activating the pointing device;

searching said database after said selecting step by the computer using said selected sub-criteria displayed in said second portion of said display device and said automatically selected sub-criteria, based upon a predefined logical operation associated with said selected sub-criteria displayed in said second portion and said automatically selected sub-criteria, without the user inputting any logical operation; and displaying on said display device the results of said search.

2. The method of claim 1 wherein said plurality of search criteria displayed on said first portion further comprises a first plurality of search criteria and a second plurality of search criteria, different from said first plurality.

3. The method of claim 2 wherein said selected sub-criteria are selected from said first plurality and from said second plurality.

4. The method of claim 3 wherein said predefined logical operation is a logical AND of all the selected sub-criteria of said first plurality to form a result, with said result logical OR with each of the selected sub-criteria of said second plurality.

5. The method of claim 4 wherein said database is a schedule of audiovisual programs.

6. The method of claim 5 wherein said first plurality of search criteria further comprising: stations, day of week, names associated with each audiovisual program, time of day, and specifications.

7. The method of claim 6 wherein said second plurality of search criteria further comprising: subject matter of said audiovisual programs.

8. The method of claim 7 wherein said second plurality of search criteria further comprising: entertainment, financial, sports, health, movies and hobbies and craft.

9. The method of claim 5 further comprising:

controlling the recording of a video recording means in response to the results of said search.

10. A method of searching a database using criteria selected from a plurality of search criteria, each having a plurality of search sub-criteria by the use of a computer having a display device having a pointing device for visually indicating a position through a cursor means, on the display device said method comprising the steps of:

for each of said plurality of search criteria, displaying on said display device said plurality of search sub-criteria; each of said plurality of search criteria having a logical operation associated therewith;

moving the cursor means on the display device, through the use of the pointing device to a desired one or more of said plurality of displayed search sub-criteria;

selecting one or more of said plurality of displayed search sub-criteria by activating the pointing device when said cursor means is positioned over each of said desired search sub-criteria;

automatically selecting all displayed search sub-criteria for any of said search criteria having an AND logical operation associated therewith and for which no search sub-criteria is otherwise selected by the user activating the pointing device;

searching said database after said selecting and automatically selecting steps by the computer using the logical operation associated with each search criteria, without inputting any logical operation; and displaying on said display device the result of said search.

11. The method of claim 10 wherein said plurality of search criteria displayed further comprises a first plurality of search criteria, and a second plurality of search criteria different from said first plurality.

12. The method of claim 11 wherein said selected sub-criteria is selected from said first plurality and from said second plurality.

13. The method of claim 12 wherein said logical operation associated with each of said search criteria is a logical AND for each of the selected criteria of said first plurality and a logical OR for each of the selected criteria of said second plurality.

14. The method of claim 13 wherein said database is a schedule of audiovisual programs.

15. The method of claim 14 wherein said first plurality of search criteria further comprising: stations, day of week, names associated with each audiovisual program, time of day, and specifications.

16. The method of claim 15 wherein said second plurality of search criteria further comprising subject matter of said audiovisual programs.

17. The method of claim 16 wherein said second plurality of search criteria further comprising entertainment, financial, sports, health, movies and hobbies and crafts.

18. The method of claim 14 further comprising:

controlling the recording of a video recording means in response to the results of said search.

* * * * *